No. 888,960.
PATENTED MAY 26, 1908.
N. S. CLARK.
TOASTER.
APPLICATION FILED DEC. 30, 1907.
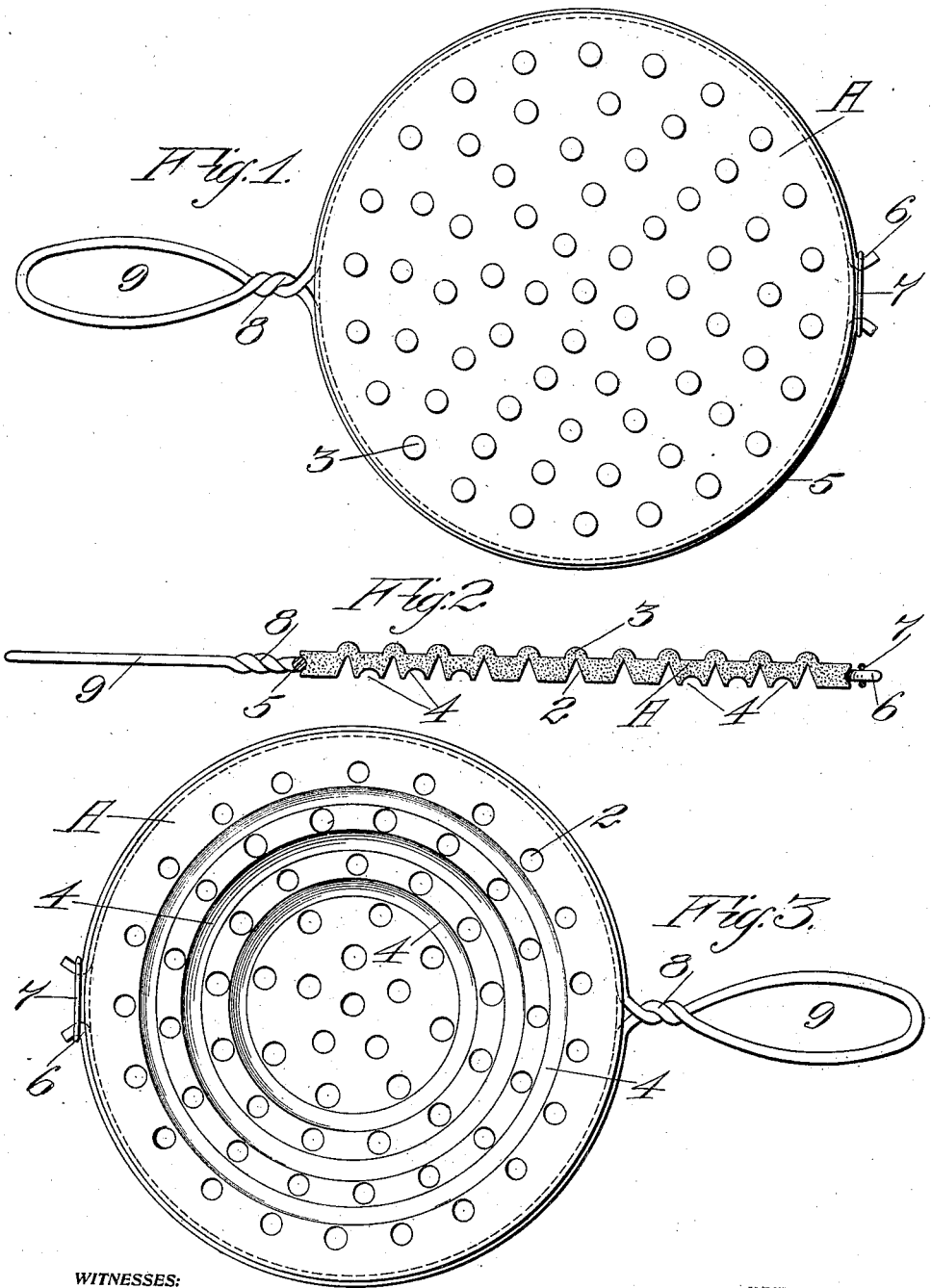
WITNESSES:
INVENTOR
Newman S. Clark
BY
Geo. H. Strong.
ATTORNEY

UNITED STATES PATENT OFFICE.

NEWMAN S. CLARK, OF RICHMOND, CALIFORNIA.

TOASTER.

No. 888,960.  Specification of Letters Patent.  Patented May 26, 1908.

Application filed December 30, 1907. Serial No. 408,536.

*To all whom it may concern:*

Be it known that I, NEWMAN S. CLARK, a citizen of the United States, residing at Richmond, in the county of Contra Costa and State of California, have invented new and useful Improvements in Toasters, of which the following is a specification.

My invention relates to an improved toasting and heating device.

It consists in a disk or plate of especially prepared material, and in details of construction which will be more fully explained by reference to the accompanying drawings, in which—

Figure 1 is a plan view of my toaster. Fig. 2 is a section of same. Fig. 3 is a bottom view.

It is the object of my invention to prepare a special compound, which is formed into thin disks or plates having depressions or grooves upon one side, and protuberances upon the opposite side, the device being especially designed for toasting bread, and moderately heating articles, or retaining the heat in articles already heated, without danger of burning.

In the preparation of my device, I make a mixture composed of about 50 parts of fire-clay, 25 parts of clean sharp sand, 10 parts of asbestos, and 15 parts of wheat bran. This mixture properly moistened and adherent may be formed in molds into disks or plates of any suitable description.

I have here shown a disk A of suitable diameter and thickness. These disks may be molded of the hereinbefore described compound, the mold being so constructed as to form depressions 2 upon one side, and corresponding elevations 3 upon the opposite side. These elevations are in the form of small knobs rising slightly above the plain surface of the disk, and forming supports for any article to be placed thereon. Thus bread to be toasted may be laid upon the upper surface having the projecting knobs, the plate having first been placed upon the stove, or over the gas, oil, or other burner, until it has become sufficiently heated for the purpose. The plate will prevent any fumes or obnoxious odors coming in contact with the bread to be toasted, and the knobs hold the bread sufficiently above the flat surface of the plate, so that there is no danger of burning the bread, but the heat arising from the surface of the plate will give the opposed surface a rich golden brown, which will be even all over the whole surface.

If desired, or preferred, for any reason, the lower surface of the disk containing the indentations may have annular channels 4 made concentrically and between the rows of indentations, thus making that portion of the plate thinner between the rows of knobs, and assisting in the circulation and application of the heat from below.

The periphery of the disk may be grooved, channeled, or otherwise formed to receive a wire or other rim 5, which is bent into circular form, the ends being turned away from each other, as shown at 6, and sufficiently separated. These ends are joined by a link, as at 7. There is a sufficient quantity of this wire to be twisted, as shown at 8, and extended, as shown at 9, to form a suitable handle for the device. The disk thus formed is of especial value, because in the manufacture, after molding it into the desired shape, it is baked with sufficient heat to produce a hard and porous fire-proof material. The wheat bran being mostly destroyed by the heat, the place occupied by it provides for the desired porosity of the toaster; and any material remaining upon the surface can be easily brushed or scraped off without injuring the remaining portion of the surface.

The bran, also, by reason of the gluten contained in it, will provide the necessary adhesive quality to unite the parts to form the disk when baked.

Having thus described my invention, what I claim and desire to secure by Letters Patent is—

1. A heating and toasting device consisting of a fire-burned earthenware of substantially flat-form and provided with pores for the circulation of heat, said disk having annular channels formed in one side and intermediate depressions which reduce the thickness of the disk at certain points and assist in the circulation and application of the heat.

2. A heating and toasting device consisting of a fire-burned earthenware disk of substantially flat form having a circumscribing channel in its edge, and having rows of elevations on one side and corresponding rows of depressions in the opposite side, said disk having, also, annular grooves between the rows of depressions, a handle projecting from the disk having curved members fitting the circumscribing channel in the edge thereof, and means connecting the ends of said members.

3. In a heating and toasting device of the character described, an earthenware plate or disk, said plate having a flat surface with upwardly projecting knobs upon one side, holes or depressions upon the opposite side registering with the knobs, and annular grooves or channels between the holes and registering with the flat surface of the plate upon the opposite side and between the knobs, and a holder secured around the rim as a handle thereto.

In testimony whereof I have hereunto set my hand in presence of two subscribing witnesses.

NEWMAN S. CLARK.

Witnesses:
A. T. HORSTMAN,
D. H. GOODRICH.